United States Patent
Amano et al.

(10) Patent No.: US 7,508,379 B2
(45) Date of Patent: Mar. 24, 2009

(54) SCREEN CONTROLLING APPARATUS

(75) Inventors: Koji Amano, Kanagawa (JP); Toshihiro Iga, Kanagawa (JP); Noriko Seto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 170 days.

(21) Appl. No.: 10/396,347

(22) Filed: Mar. 26, 2003

(65) Prior Publication Data

US 2004/0119696 A1    Jun. 24, 2004

(30) Foreign Application Priority Data

Dec. 18, 2002    (JP)    ............ P.2002-366469

(51) Int. Cl.
G09G 5/00    (2006.01)
G06F 3/02    (2006.01)

(52) U.S. Cl. .................................. 345/171; 715/47

(58) Field of Classification Search ......... 345/168–172; 715/764, 765, 771, 773, 810, 513, 703, 536; 725/47; 704/8; 707/102
See application file for complete search history.

(56) References Cited

U.S. PATENT DOCUMENTS

| | | | | |
|---|---|---|---|---|
| 5,634,134 A * | 5/1997 | Kumai et al. | ............... | 715/536 |
| 5,915,066 A * | 6/1999 | Katayama | ............... | 386/70 |
| 5,917,484 A * | 6/1999 | Mullaney | ............... | 715/703 |
| 6,119,611 A * | 9/2000 | Tomita | ............... | 112/470.04 |
| 6,384,922 B1 | 5/2002 | Hayama et al. | | |
| 6,754,668 B2 * | 6/2004 | Noble et al. | ............... | 707/102 |
| 6,760,548 B2 | 7/2004 | Seki et al. | | |
| 6,785,866 B1 * | 8/2004 | Lewis et al. | ............... | 715/513 |
| 6,809,725 B1 * | 10/2004 | Zhang | ............... | 345/171 |
| 6,978,087 B2 | 12/2005 | Seki et al. | | |
| 7,124,178 B2 | 10/2006 | Torii | | |
| 7,185,289 B1 * | 2/2007 | Taima | ............... | 715/810 |
| 2002/0083453 A1 * | 6/2002 | Menez | ............... | 725/47 |
| 2004/0049458 A1 | 3/2004 | Kunugi et al. | | |

FOREIGN PATENT DOCUMENTS

| | | |
|---|---|---|
| EP | 0 499 211 A2 | 2/1992 |
| JP | A-04-261583 | 9/1992 |
| JP | A-04-347719 | 12/1992 |
| JP | A-06-119372 | 4/1994 |
| JP | A-06-243155 | 9/1994 |
| JP | A-08-108602 | 4/1996 |
| JP | A 2000-305690 | 11/2000 |
| JP | A 2001-119510 | 4/2001 |
| JP | A-2002-072330 | 3/2002 |
| JP | A-2002-259875 | 9/2002 |
| JP | A-2002-324017 | 11/2002 |

* cited by examiner

*Primary Examiner*—Kevin M Nguyen
(74) *Attorney, Agent, or Firm*—Oliff & Berridge, PLC

(57) ABSTRACT

A screen controlling apparatus includes an LCD and a graphic controller for controlling display of buttons for switching languages. The graphic controller displays, at a position corresponding to each of buttons, characters in each of languages, which is switched with each of buttons. Also, the graphic controller displays, at each of positions corresponding to each of buttons, characters in both each of languages, which is selected by switching with each of buttons, and a language currently selected.

18 Claims, 11 Drawing Sheets

表示させたい言語を選択して「決定」を押してください。
「決定」を押すと操作中の設定はすべてリセットされ、初期画面に戻ります。

ことば切り替え            Cancel 取消   Save 決定

☒ Japanese      ☐ Spanish
  日本語           Español

☐ English       ☐ French
                  Français

☐ German        ☐ Italian
  Deutsch         Italiano

Choose the required language and select Save.
All current settings will be reset and default screen displayed when Save is selected.

Language　　　　　　　　　　　　　　　　　　　　　　　　Cancel　　Save

- [ ] 日本語
- [▨] English
- [ ] Deutsch
- [ ] Español
- [ ] Français
- [ ] Italiano

JAPANESE (DISPLAYED IN JAPANESE LANGUAGE)

- [▨] 日本語
- [ ] English
- [ ] Deutsch
- [ ] Español
- [ ] Français
- [ ] Italiano

JAPANESE (DISPLAYED IN JAPANESE LANGUAGE)

FIG. 13

```
Choose the required language and select Save.
All current settings will be reset and default screen displayed when Save is selected.
```

| Language | | | Cancel | Save |

- ☐ Japanese 日本語
- ▨ English
- ☐ German Deutsch
- ☐ Spanish Español
- ☐ French Français
- ☐ Italian Italiano

| ことば切り替え | | | Cancel 取消 | Save 決定 |

- ▨ Japanese 日本語
- ☐ English
- ☐ German Deutsch
- ☐ Spanish Español
- ☐ French Français
- ☐ Italian Italiano

SCREEN CONTROLLING APPARATUS

The present disclosure relates to the subject matter contained in Japanese Patent Application No. 2002-366469 filed on Dec. 18, 2002, which is incorporated herein by reference in its entirety.

BACKGROUND OF THE INVENTION

1. Field of the Invention

The present invention relates to a screen controlling apparatus for controlling display of a button, such as an icon, on a display unit, such as a touch-sensitive panel.

2. Description of the Related Art

An office automation equipment, such as a duplicator, a facsimile machine and a printer, has a touch-sensitive operation controlling panel, such as a CRT and an LCD, and a user operates a user interface (UI) screen in the panel to accomplish operation.

On the UI screen, various of functions, detailed items of the respective functions, and guidance of the functions, items and operation are displayed in language of a certain country or region (in general, the country where the duplicator, etc. is installed, for example, Japanese language in Japan). The duplicator, etc. have language data for plural countries installed therein, and the language to be displayed can be switched according to user configuration.

Examples of a method for user configuration of display language include a method in which a "language switching" key is provided outside the touch-sensitive panel, and (1) the installed languages are displayed one by one upon pressing the "language switching" key, or (2) a list of the installed language is displayed upon pressing the "language switching" key, and a desired language is selected from the list (as described, for example, in JP-A-2000-119510).

The method (1) involves the following problem. The number of pressing the key until the desired language is displayed is increased upon increasing the number of the installed languages. For example, in a case where 11 languages are installed, the key is necessarily pressed 10 times in the worst case, and unnecessary languages are displayed 10 times. Furthermore, in a case where caution and restriction matters must be displayed upon switching language, for example, configuration and display of a duplicator, etc. must be initialized after language is changed, there is no means for notifying the matter.

Even in a case where a list of installed language is displayed in the current language, a user suffers significant inconvenience because the user is intended to switch the current language to another language. Specifically, when the user intend to switch a display screen in Japanese language to English language and [English] is displayed in Japanese language, there is such a problem that a person who cannot read Japanese language cannot press the "English" button in Japanese language.

Furthermore, although the restriction matters can be displayed in the list screen, the restriction matters and guidance are displayed in the former language even after selecting a new language, and thus the user suffers inconvenience. For example, a "Close" button in Japanese language is still displayed with representation "Close" in Japanese even after selecting English language as a new language.

Moreover, JP-A-2000-305690 intends to solve the problem associated with the method (2) by displaying the language list in a language previously set, for example, in English, which is a language commonly intelligible for people of many countries, but it is difficult to be understood by a person who cannot read English language. It is still difficult for a person who cannot read English to understand and operate the display.

SUMMARY OF THE INVENTION

The invention has been developed to solve the problems. According to an aspect of the invention, there is provided a screen controlling apparatus including a display section and a display controlling section. The display section displays a screen. The display controlling section controls display of buttons for switching languages on the display section. The display controlling section displays, at each of positions corresponding to each of buttons, characters in each of languages, which is to be switched by each of buttons.

In alternative, the display controlling section may display, at each of positions corresponding to each of buttons, characters in both each of languages, which is to be switched by each of buttons, and a language currently selected.

According to the aspect of the invention, the display controlling section controls display of buttons for switching languages on the display section. The display controlling section displays, at each of positions corresponding to each of buttons, characters in each of languages, which is switched with each of buttons. Therefore, a user who is intending to switch the language can understand the button in the language, which is to be switched by the button.

Furthermore, the display controlling section displays, at each of positions corresponding to each of buttons, characters in both each of languages, which is to be switched by each of buttons, and a language currently selected. Therefore, when a user erroneously select an unintended language, the user can conveniently select a button for canceling the operation.

BRIEF DESCRIPTION OF THE DRAWINGS

FIG. 8 is a diagram showing an example of font data.

FIG. 11 is a figure showing an example of a language selecting screen (displayed in English language).

FIG. 12 is a figure showing a screen upon selecting an "Japanese" button.

FIG. 13 is a figure showing a screen that appears upon displaying the language selecting screen in a mode displaying in English language.

FIG. 14 is a figure showing a screen upon selecting an "Japanese" button.

DETAILED DESCRIPTION OF THE PREFERRED EMBODIMENTS

Figure 1:
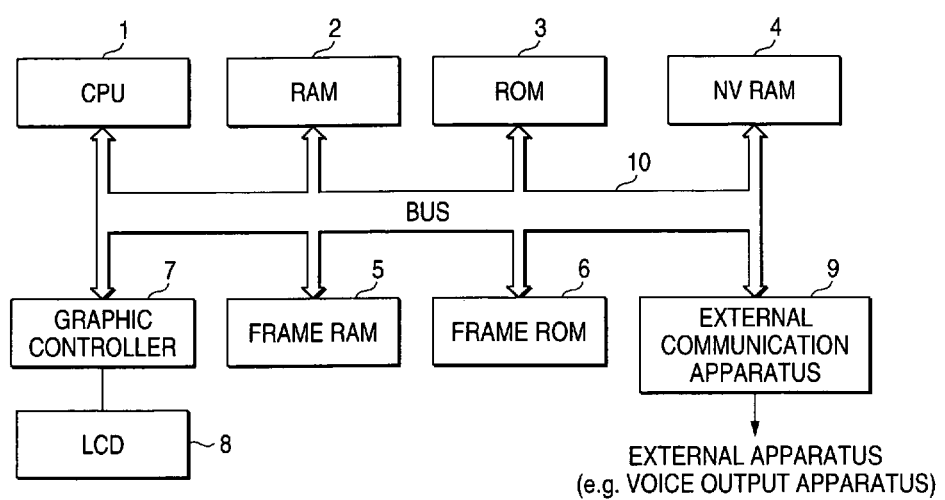
FIG. 1 is a block diagram showing an example of a constitution of a display controlling apparatus according to an embodiment of the invention.

Embodiments of the invention will be described with reference to the attached drawings. FIG. 1 is a block diagram showing an example of a constitution of a display controlling apparatus according to an embodiment of the invention. That is, the display controlling apparatus of this embodiment is mainly applied to a duplicator. The display controlling apparatus of the embodiment includes a microprocessor (CPU) 1 for executing a program, a read/write memory (RAM) 2 for a program, a read only memory (ROM) 3 for a program, a non-volatile memory (NVRAM) 4, a read/write memory for controlling screen (Frame RAM) 5, a read only memory for screen data (Frame ROM) 6, and a graphic controller 7, which is a control processor of an LCD 8 or a CRT as a display device.

The display controlling apparatus is connected to an external image input apparatus, an image output apparatus or a voice output apparatus through an external communication apparatus 9. The respective devices are connected through a bus 10.

Figure 2:
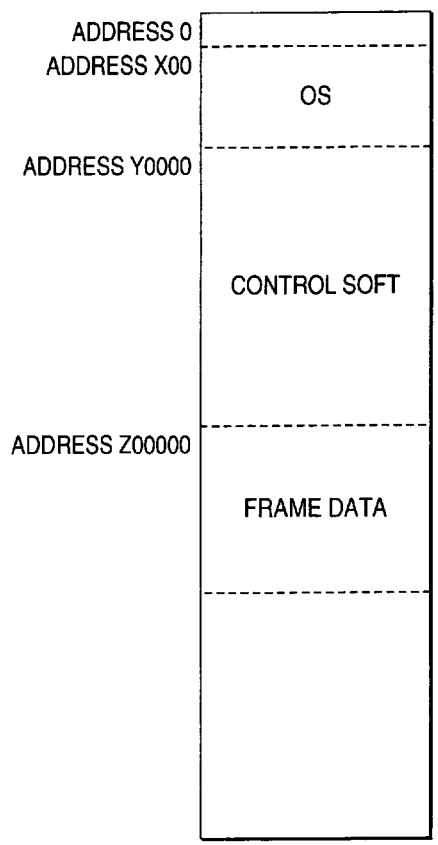
FIG. 2 is a schematic diagram showing an arrangement of the data and the programs of the respective devices on the bus.

FIG. 2 is a schematic diagram showing an arrangement of data and programs of the respective devices on the bus. The data including various data (Frame Data) containing screen data and a control program (Control Soft) are stored at predetermined addresses or later.

Figure 3:
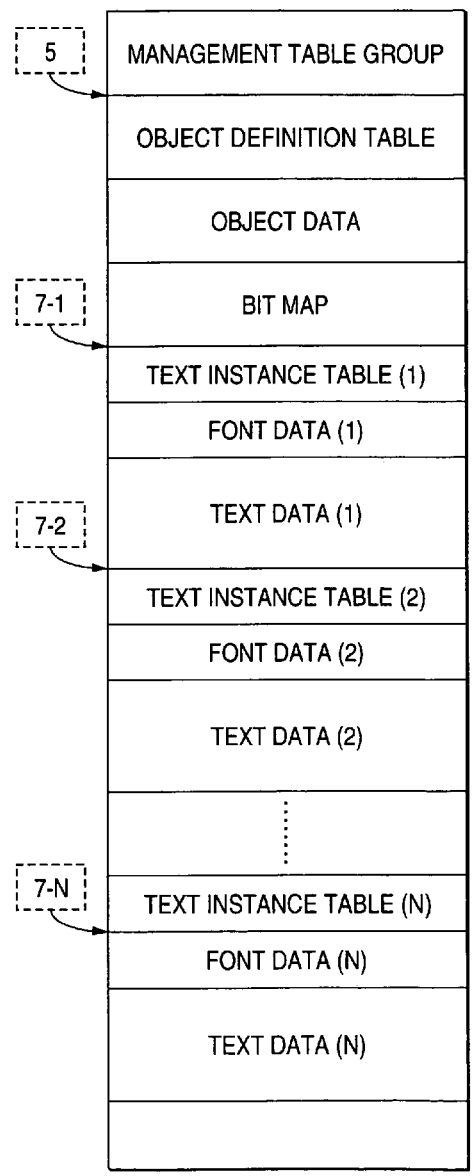
FIG. 3 is a schematic diagram showing a total constitution of the screen data.

FIG. 3 is a schematic diagram showing a total constitution of the screen data. The screen data contains an object definition table, object data and a bitmap, and plural sets of a text instance table, font data and text data are provided in the number of the languages installed.

Figure 4:
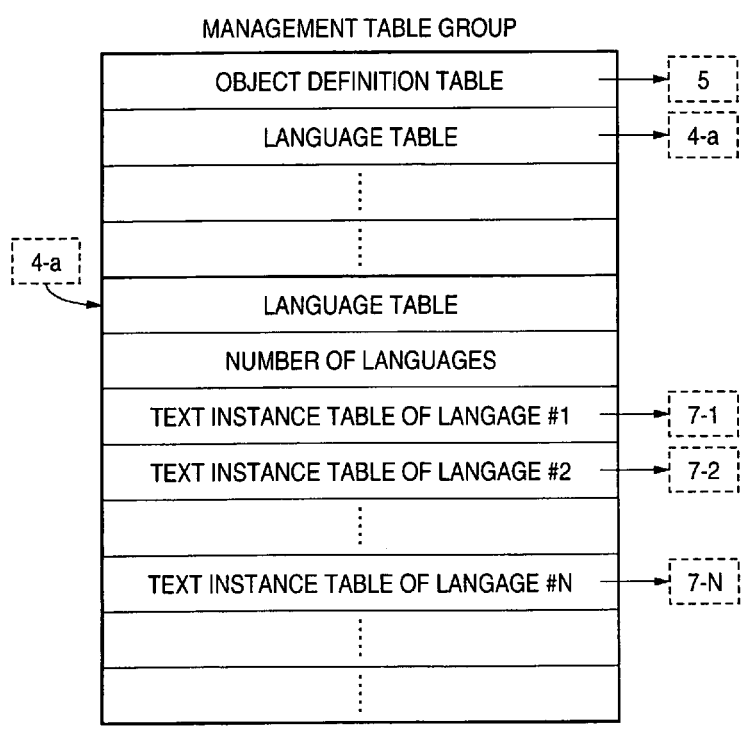
FIG. 4 is a schematic diagram showing a structure of a management table.

FIGS. 4 to 9 are schematic diagrams showing part of structures of the tables and the data in the screen data. FIG. 4 is a schematic diagram showing a structure of a management table, in which all the tables and the data, such as the object definition table (see FIG. 5) and language tables, are pointed from here as sources. The management table contains language tables, which point text instance tables (see FIG. 7) of the respective languages.

Figure 5:
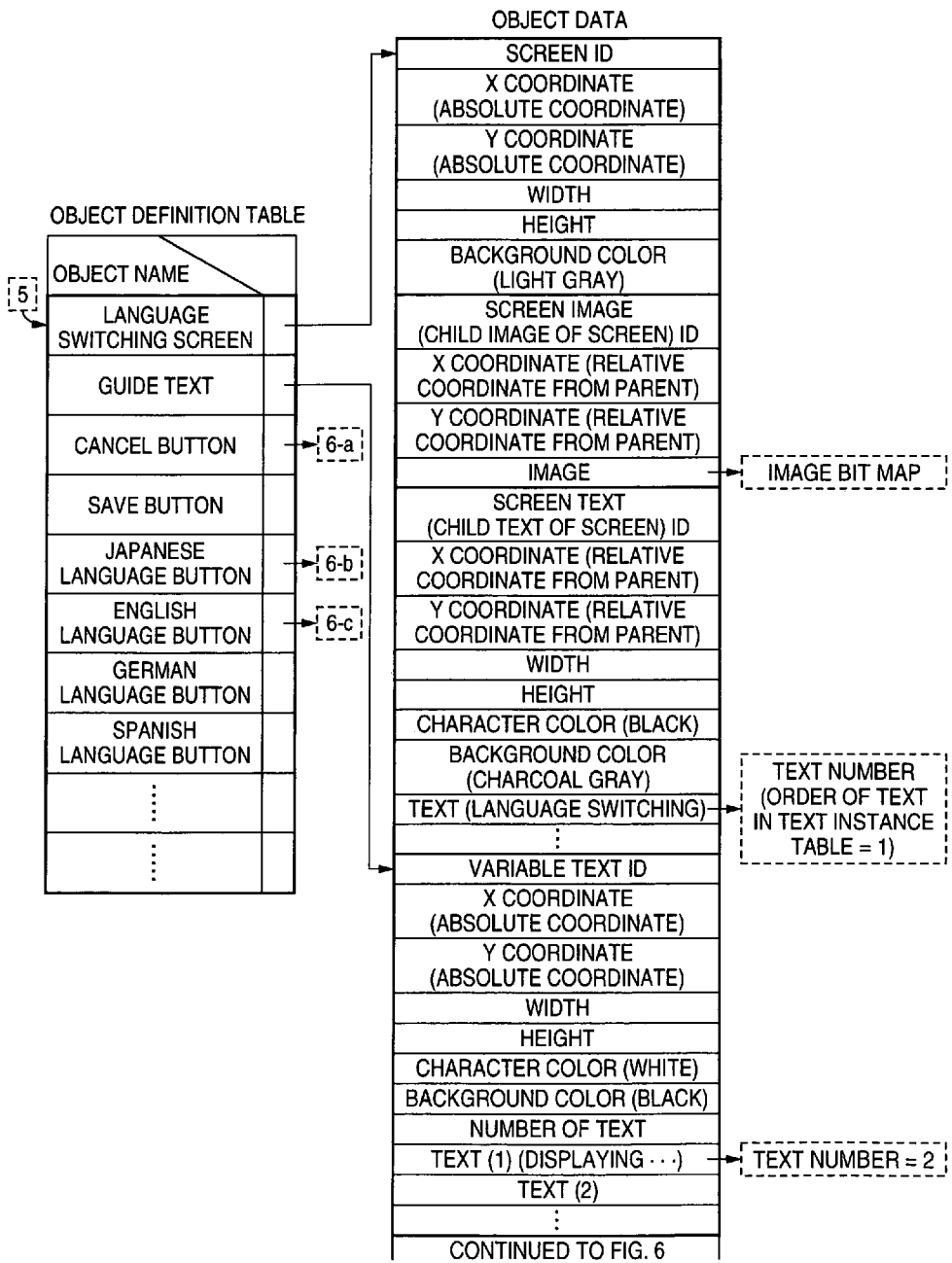
FIG. 5 is a schematic diagram showing a structure of the object definition table and the object data.
Figure 6:
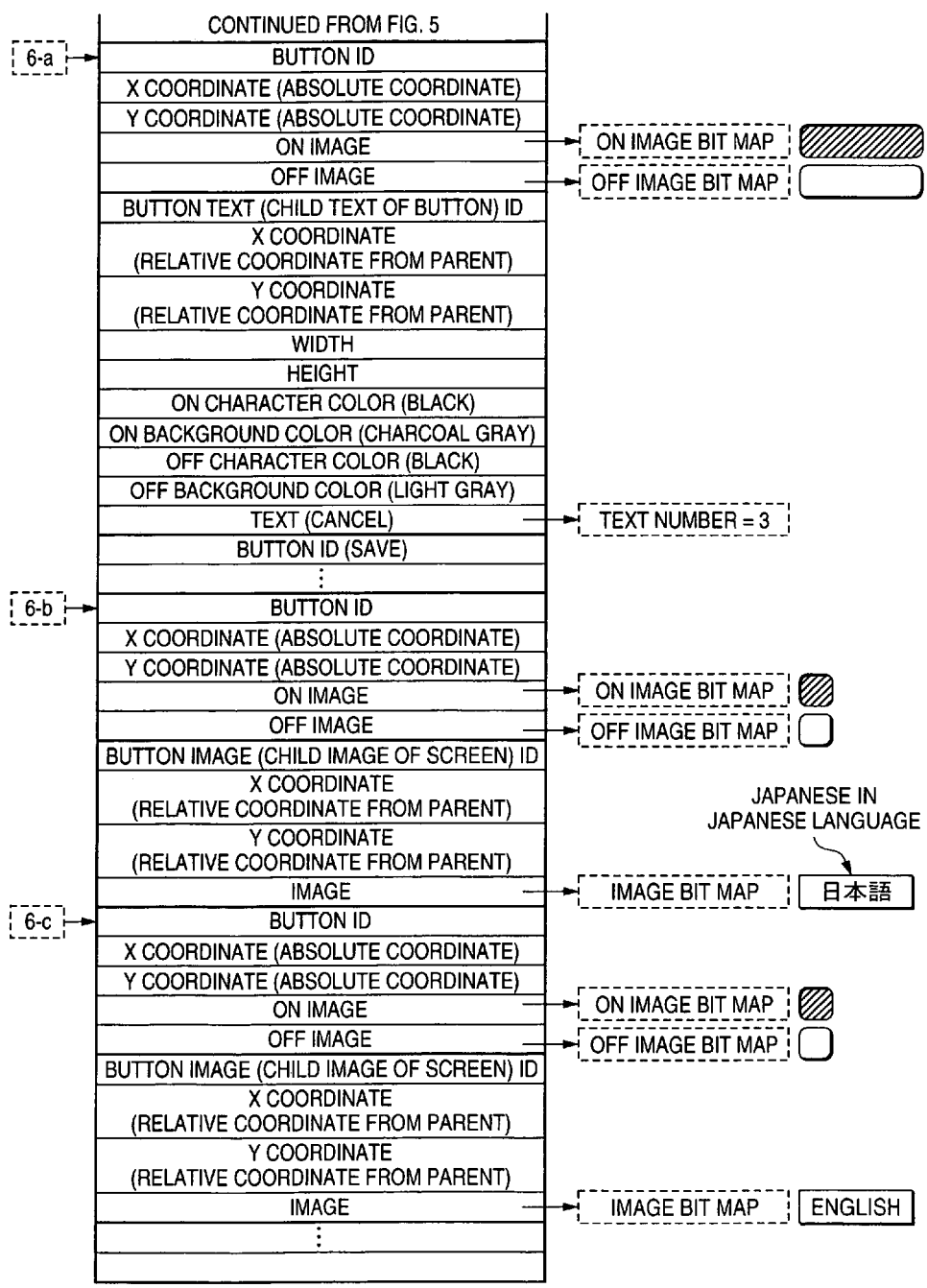
FIG. 6 is a schematic diagram showing a structure of the object data.

FIGS. 5 and 6 are schematic diagrams showing a structure of the object definition table and the object data. The object definition table contains all parts constituting the UI screen (i.e., objects including buttons, images and texts) described with a pair of an object name and a pointer to the object data.

The object data is pointed from the object definition table, and contains starting positions (X-Y coordinates) of the respective objects, widths and heights of the objects, and pointers to bitmaps in a case of buttons and images, or text codes in a case of texts.

The native script of the display language is carried out with an image but not a text in order to display in a correct manner with any character code irrespective to character code.

Figure 7:
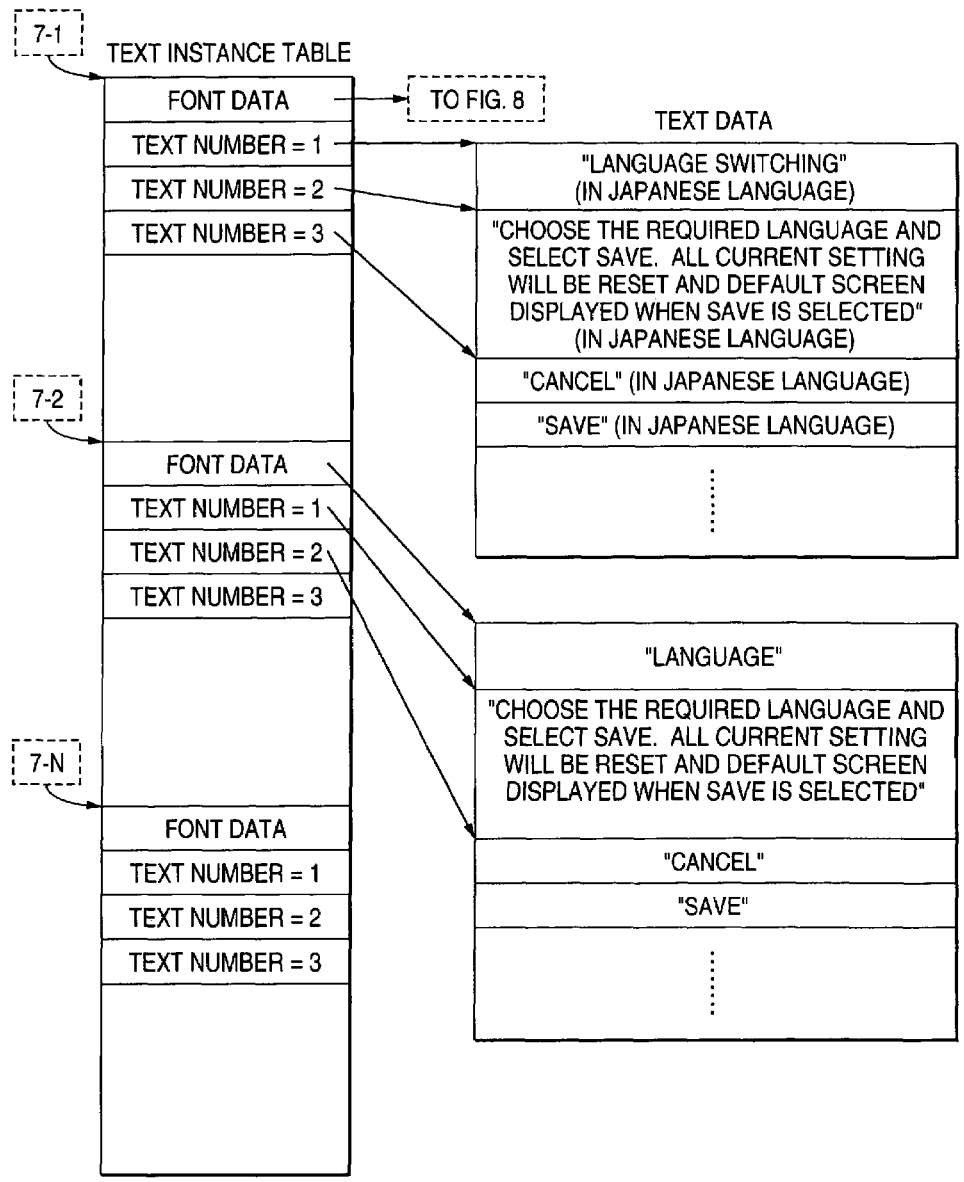
FIG. 7 is a schematic diagram showing structures of the text instance tables and the text data.

FIG. 7 is a schematic diagram showing structures of the text instance tables and the text data. The text instance tables are provided in the number of the languages installed, and each contains a pointer to the font data (see FIG. 8) at the initial point of the table and pointers to the text data in the order of the text codes.

The text data contains character codes of the entire text for the respective languages. As the language code, EUC and Shift-JIS may be used for Japanese, and ISO 8859 (ASCII) may be used for Western languages. For example, a code string for the text "languages switch" in Japanese in EUC is "a4b3 a4c8 a4d0 c0da a4ea c2d8 a4a8", and that for the text "Language" in English in ISO 8859 (ASCII) is "4c 61 6e 67 75 61 67 65".

Figure 8:
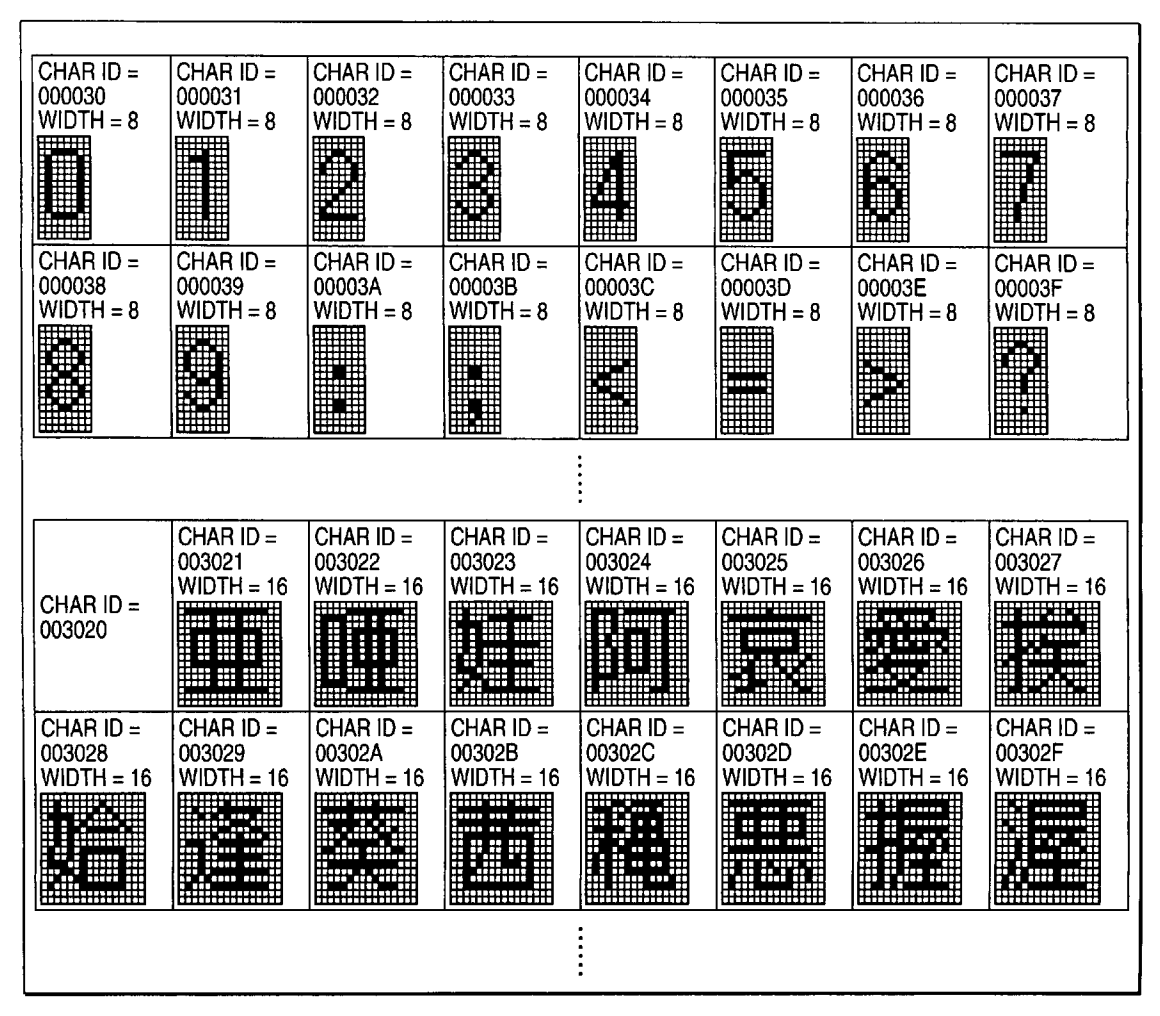

FIG. 8 is a diagram showing an example of font data. A pointer to a bitmap for a character and other data are described at a position corresponding to the character code (Char ID). The text instance table, the text data and the font data are provided per language, i.e., they are provided in the number of the languages installed.

Figure 9:
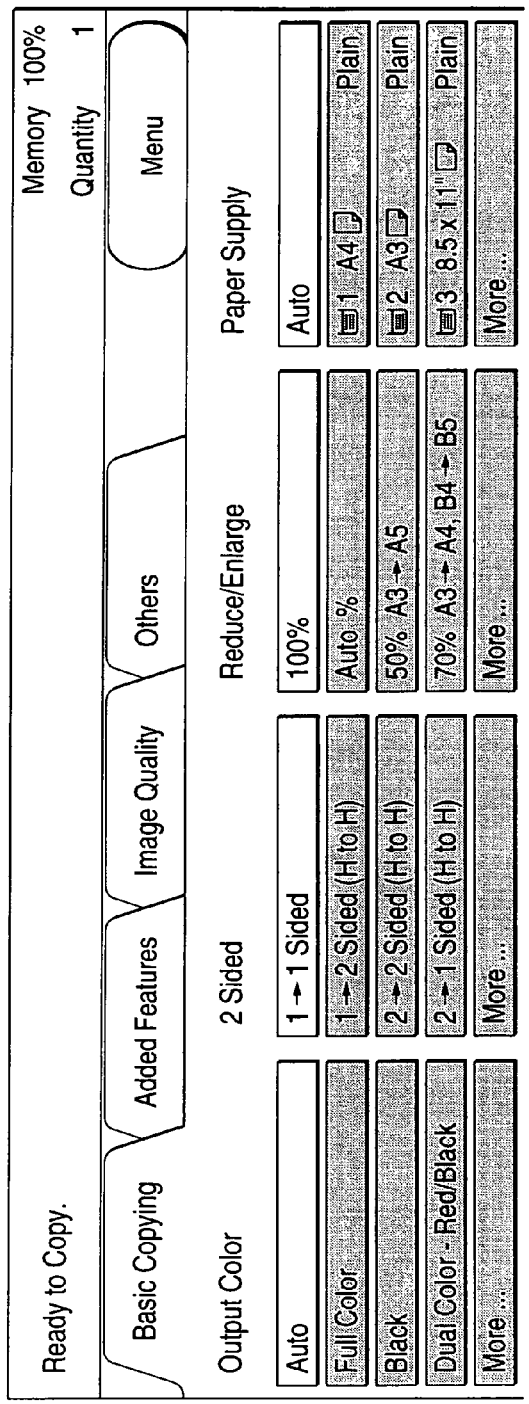
FIG. 9 is a figure showing one of copy operation screens displayed in English language.
Figure 10:
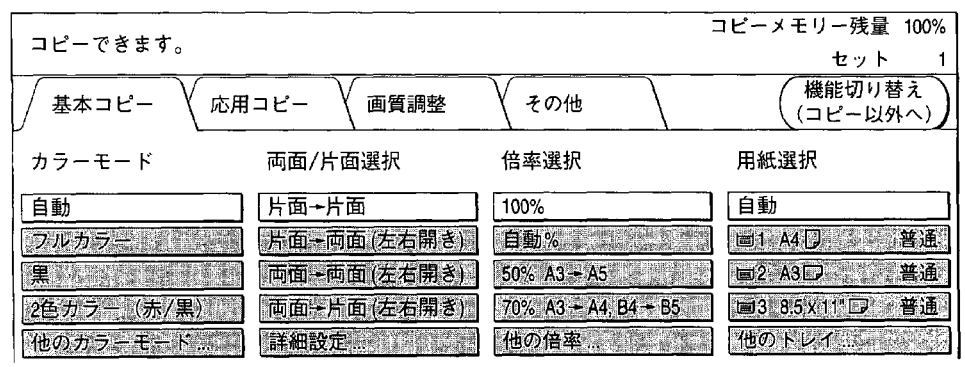
FIG. 10 is a figure showing one of copy operation screens displayed in Japanese language.

FIGS. 9 to 12 are figures showing examples of the UI screen. FIG. 9 shows one of copy operation screens displayed in English language. FIG. 10 shows the same copy operation screen as in FIG. 9, but it is displayed in Japanese language. Screen display in plural languages as in FIGS. 9 and 10 can be accomplished by appointing with a language selecting button described later.

FIG. 11 is a figure showing an example of a language selecting screen that appears upon displaying the language selecting screen in a mode displaying in English language. The language selecting screen appears upon pressing a "language switching" hardware key, which is not shown in the figure, provided outside the UI screen.

The language selecting buttons are shown by bitmaps in the native script in the respective languages (i.e., the characters of the languages to be selected by the buttons). In this state, which is in the mode displaying in English language, the "English" button is displayed in English language in an ON state, and the function buttons, such as "Cancel" button and a "Save" button, and messages, such as a guide text, are also displayed in English language.

FIG. 12 is a figure showing a screen upon selecting the "Japanese" button (in Japanese language), which is one of the language selecting buttons, in the state shown in FIG. 12. The "Japanese" button (in Japanese language) is displayed in an ON state, and the function buttons, such as "Cancel" button and a "Save" button, and messages, such as a guide text, are switched to display in Japanese language.

Upon pressing the "Cancel" button displayed in English language or the "Cancel" button displayed in Japanese language in these screens, the language selecting screen is closed, and the display in the previous language is retrieved. Upon pressing the "Save" button displayed in English language or the "Save" button displayed in Japanese language in these screens, the language selecting screen is closed, and it is switched to a display in the selected language.

For example, upon pressing the "Japanese" button (in Japanese language) displayed in the language selecting screen shown in FIG. 11, it is switched to the language selecting screen shown in FIG. 12, and upon pressing the "Cancel" button (in Japanese language) therein, the display in the previous language (i.e., English language herein) is retrieved. On the other hand, upon pressing the "Save" button (in Japanese language), it is switched to the copy operation screen displayed in Japanese language as shown in FIG. 10.

Accordingly, the button corresponding to each of languages are displayed with characters of each of languages in the language selecting screens shown in FIGS. 11 and 12. Therefore, a user who understands only the language to be selected can accurately select the button of that language.

After pressing the desired language selecting button by the user, the function buttons and the messages, such as guidance text, are displayed in the selected language. Therefore, the user can conveniently understand the current state and buttons to be selected hereafter.

Other examples of display will be described. FIGS. 13 and 14 are figures showing language selecting screens, in which languages capable of being displayed and the operation buttons are displayed in both the current language and the native language. FIG. 13 is a figure showing a screen that appears upon displaying the language selecting screen in the mode displaying in English language. In this case, the messages and the function buttons are displayed only in English language because the current language is English but no new language is selected. Furthermore, the language selecting buttons are displayed in both English language and the languages corresponding to the buttons.

FIG. 14 is a figure showing a screen that appears upon pressing the "Japanese" button in the state shown in FIG. 13. At this time, the current language is English with the new language (i.e., the selected language) being Japanese, and the function buttons are switched to display in both English language (current language) and Japanese language (new language). For example, the button for canceling is displayed with both "Cancel" in English language and "Cancel" in Japanese language.

The representations of the selecting buttons of languages capable of being selected and the function buttons herein are maintained in both the current language and the native language. Consequently, a user can conveniently execute a canceling operation (for example, retrieving the display in English language) and a subsequent operation (for example, selecting French language but not Japanese language) upon erroneous operation or selection by the user. Particularly, in a case where a user capable of understanding only the current language makes erroneous operation, such a problem is removed that the user can make no subsequent operation due to deletion of all representations in the current language.

In other words, the function buttons are also displayed in the current language before selecting languages, and thus even in the case where a user capable of understanding only the current language erroneously select the language selecting screen, the user can accurately retrieve the current language as the selected language. Furthermore, the "Save" button is also displayed in a new language after selecting languages, and thus a user capable of understanding the new language can accurately select the language.

Read out of the data and display will be specifically described. Procedures in the case where the screen shown in FIG. 12 is displayed will be shown herein. The language switching screen is searched from the object definition table (see FIG. 5) to detect actual data in the object data (see FIGS. 5 and 6), and the screen is filled with a color described in the object data.

The screen has subordinate objects, which are then processed. Subsequently, bitmaps of the subordinate objects are displayed at predetermined positions. These correspond to a strip showing the screen title (language switching).

Subordinate texts are then displayed at the predetermined positions in the following procedure. At first, the character code string of "Language" in English, i.e., "4c 61 6e 67 75 61 67 65", is detected from the text data (see FIG. 7) through the text instance table (see 7-2 in FIG. 7), and bitmaps corresponding to the respective character codes are detected from the font data (see FIG. 8). The characters are then displayed in the predetermined character color from the predetermined position. In the case of texts, the text region is filled with the predetermined background color before displaying the texts.

The guide text is searched from the object definition table to detect actual data in the object data. Subsequently, the number of the text to be displayed is detected in terms of character code string from the text data through the text instance table, and bitmaps corresponding to the respective character codes are detected from the font data. The characters are then displayed in the predetermined color from the predetermined position.

Next, the "Cancel" button in English language is searched from the object definition table to detect actual data in the object data. The bitmap to be displayed (off image in this case) is displayed at the predetermined position.

The button has subordinate objects, which are then processed. That is, the subordinate text is displayed at the predetermined positions in the following procedure. The character code string of "Cancel" in English language is detected from the text data through the text instance table, and bitmaps corresponding to the respective character codes are detected from the font data. The characters are then displayed in a color corresponding to the state of the superordinate button (off state in this case) from the predetermined position.

The "Save" button in English language is then displayed in the similar manner. The "English" button in English language is searched from the object definition table to detect actual data in the object data. The bitmap to be displayed (on image in this case) is displayed at the predetermined position.

The characters "English" in English language, i.e., the subordinate bitmaps, are displayed at the predetermined position. Then, the "Japanese" button (in Japanese language) is searched from the object definition table to detect actual data in the object data. The bitmap to be displayed (off image in this case) is displayed at the predetermined position.

The characters "Japanese" (in Japanese language), i.e., the subordinate bitmaps, are displayed at the predetermined position. The buttons for German language, Spanish language and the like are then displayed in the similar manner as in the foregoing.

In the case where the screen shown in FIG. 12 is displayed upon pressing the "Japanese" button (displayed in Japanese language) in the state shown in FIG. 11, the text instance table is switched to that corresponds to Japanese language (see 7-1 in FIG. 7) to accomplish a redisplay process of the screen.

For example, the display part of "Language" in English language is processed in the following manner. The character code string of "language switching" (in Japanese language), i.e., "a4b3 a4c8 a4d0 c0da a4ea c2d8 a4a8", is detected from the text data through the text instance table corresponding to Japanese language, and bitmaps corresponding to the respective character codes are detected from the font data. The characters are then displayed in the predetermined character color from the predetermined position.

In addition to the foregoing screen display, the apparatus may further has a unit for phonetically outputting pronunciation corresponding to a language upon pressing a desired language selecting button in the language selecting screen by a user. According to the configuration, the user can comprehend the fact that the operation of switching language is accomplished and the option as to whether switching to the objective language is possible.

As described in the foregoing, the following effects can be obtained by the invention. That is, the language is displayed in the native language upon selecting languages, and thus users of all the languages can understand and operate. The functional buttons and the messages are also displayed in the selected language, and thus such an apparatus can be provided that is convenient to be used by users of all the languages.

Furthermore, both the current language and the selected language are displayed, and thus in the case where the user of the current language erroneously displays the language selecting screen, selection of languages can be accurately cancelled. Moreover, the guidance and the caution and restriction matters are displayed in the current language before selecting languages, and thus a user of the current language can comprehend operation procedures and avoiding means. After setting language, on the other hand, the guidance and restriction matters are displayed in the new language, and thus a user of the new language can comprehend operation procedures and avoiding means.

What is claimed is:

1. A screen controlling apparatus comprising
a display section that displays a plurality of first buttons for switching a plurality of different languages and at least one second button, which is displayed in a first language, on a screen; and
a display controlling section that controls a display of the first buttons on the screen;
a memory accessible to the display controlling section that stores at least one text instance table for the different languages, where the text instance table contains character codes for each of the different languages;
wherein the display section displays, at positions corresponding to the first buttons on the screen, characters in the different languages which are to be switched to by the respective first buttons; and
when one of the first buttons is selected, the display controlling section accesses the text instance table to retrieve selected character codes in a language switched to by the selected one of the first buttons, and the display section displays on the screen, at a position corresponding to the at least one second button, which is displayed in a second language, selected characters based on the retrieved character codes, without changing the display of the plurality of first buttons for switching a plurality of different languages.

2. The screen controlling apparatus according to claim 1, wherein when the one of the first buttons is selected, the display section displays characters of a predetermined message in the language corresponding to the selected first button.

3. The screen controlling apparatus according to claim 2, wherein before the one of the first buttons is selected, the display section displays characters of the predetermined message only in the language currently selected.

4. The screen controlling apparatus according to claim 1, further comprising:
a voice output section for outputting information indicating that the one of the first buttons is selected, by voice in the one of the languages, when the one of the first buttons is selected.

5. The screen controlling apparatus according to claim 1, wherein number of the first buttons is equal to or larger than three.

6. The screen controlling apparatus according to claim 1, wherein before one of the first buttons is selected, the display section displays on the screen, at a position corresponding to the at least one second button, characters in only the language currently selected.

7. The screen controlling apparatus according to claim 1, wherein the display section displays, at positions corresponding to the first buttons on the screen, characters in the different languages using image data.

8. A screen controlling apparatus comprising
a display section that displays a plurality of first buttons for switching languages and at least one second button, which is displayed in a language currently selected, on a screen; and
a display controlling section that controls a display of the first buttons on the screen,
wherein the display section displays, at each of positions corresponding to each of the first buttons on the screen, characters in both (a) a language which is to be switched to by each of the first buttons and (b) the language currently selected;
the languages which are to be switched to by the respective first buttons are different from each other; and
when one of the first buttons is selected, the display section displays on the screen, at a position corresponding to the at least one second button, the at least one second button in both (a) a language switched to by the selected one of the first buttons and (b) the language currently selected.

9. The screen controlling apparatus according to claim 8, wherein when the one of the first buttons is selected, the display section displays characters of a predetermined message in the language corresponding to the selected first button.

10. The screen controlling apparatus according to claim 9, wherein before the one of the first buttons is selected, the display section displays characters of the predetermined message only in the language currently selected.

11. The screen controlling apparatus according to claim 8, further comprising:
a voice output section for outputting information indicating that the one of the first buttons is selected, by voice in the one of the languages, when the one of the first buttons is selected.

12. The screen controlling apparatus according to claim 8, wherein number of the first buttons is equal to or larger than three.

13. The screen controlling apparatus according to claim 8, wherein:
the display section displays on the screen a message in the language currently selected at a position other than the first and second buttons, and
when the one of the first button is selected, the display section displays the message in the language switched to by the selected one of the first buttons.

14. The screen controlling apparatus according to claim 8, wherein before one of the first buttons is selected, the display section displays on the screen, at a position corresponding to the at least one second button, characters in only the language currently selected.

15. The screen controlling apparatus according to claim 8, wherein, the display section displays, at positions corresponding to the first buttons on the screen, characters in the language which is to be switched to by each of the first buttons and the language currently selected, using image data.

16. The screen controlling apparatus according to claim 8, wherein the display section displays, at each of positions corresponding to each of the first buttons on the screen, characters in both (a) the language which is to be switched to by each of the first buttons and (b) the language currently selected, except at a position corresponding to the first button of the language currently selected.

17. A screen controlling apparatus comprising:
a display section that displays a plurality of first buttons for switching a plurality of different languages and a second button for canceling the switching, the different languages including at least three national languages, and
a display controlling section that controls the display section to display the first buttons and the second button, wherein
the display controlling section controls the display section to display two or less national languages including a first national language for the second button at a substantially same time as switching the first national language to a second national language according to a user selection of one of the first buttons, and controls the display section to display two or less national languages including the second national language for the second button at a substantially same time as switching the second national language to a third national language according to a user selection of one of the first buttons.

18. The screen controlling apparatus according to claim 17, wherein the display controlling section controls the display section to display the first and second national languages for the second button at the substantially same time as switching the first national language to the second national language according to the user selection, and controls the display section to display the second and third national languages for the second button at the substantially same time as switching the second national language to the third national language according to the user selection.

* * * * *